(12) United States Patent
Hui et al.

(10) Patent No.: US 8,800,010 B2
(45) Date of Patent: Aug. 5, 2014

(54) DISTRIBUTED GROUP TEMPORAL KEY (GTK) STATE MANAGEMENT

(75) Inventors: Jonathan W. Hui, Foster City, CA (US); Anjum Ahuja, Pearland, TX (US); Krishna Kondaka, Los Altos, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 140 days.

(21) Appl. No.: 13/451,918

(22) Filed: Apr. 20, 2012

(65) Prior Publication Data
US 2013/0283360 A1   Oct. 24, 2013

(51) Int. Cl.
*H04L 9/16*   (2006.01)

(52) U.S. Cl.
USPC .............. 726/6; 713/171; 380/273; 380/278; 380/286

(58) Field of Classification Search
USPC ................... 726/6; 380/255–276, 278, 286; 713/150–172
See application file for complete search history.

(56) References Cited

U.S. PATENT DOCUMENTS

| | | | |
|---|---|---|---|
| 7,171,555 B1 | 1/2007 | Salowey et al. | |
| 7,640,430 B2 | 12/2009 | Zhou et al. | |
| 7,657,744 B2 | 2/2010 | Kok | |
| 7,793,336 B2 | 9/2010 | Salowey et al. | |
| 7,822,406 B2 | 10/2010 | Lee et al. | |
| 7,870,600 B2 | 1/2011 | Huotari et al. | |
| 8,037,514 B2 | 10/2011 | Kuffel et al. | |
| 8,094,822 B2 * | 1/2012 | Suzuki | 380/277 |
| 8,245,278 B2 | 8/2012 | McRae et al. | |
| 2008/0031155 A1 * | 2/2008 | Korus et al. | 370/254 |
| 2010/0023752 A1 * | 1/2010 | Barker et al. | 713/153 |
| 2010/0180116 A1 * | 7/2010 | Coan et al. | 713/168 |
| 2011/0243330 A1 * | 10/2011 | Hu et al. | 380/278 |

OTHER PUBLICATIONS

Alexander, R., "Adapted Multimedia Internet KEYing (AMIKEY): An Extension of Multimedia Internet KEYing (MIKEY) Methods for Generic LLN Environments", draft-alexander-roll-mikey-lln-key-mgmt-03, Internet Engineering Task Force, Network Working Group, Internet-Draft, Mar. 2012, 42 pages.
"Identity-Based Networking Services: MAC Security", MACsec Deployment Guide, Cisco Systems, Inc., San Jose, Calif., May 2011, 32 pages.
Winter, et al., "RPL: IPv6 Routing Protocol for Low-Power and Lossy Networks", Internet Engineering Task Force, Request for Comments 6550, Mar. 2012, 158 pages.

* cited by examiner

*Primary Examiner* — Beemnet Dada
*Assistant Examiner* — J. Brant Murphy
(74) *Attorney, Agent, or Firm* — Edwards Wildman Palmer LLP; James M. Behmke; Stephen D. LeBarron

(57) ABSTRACT

In one embodiment, each security protocol supplicant in a computer network determines its group temporal key (GTK) state, and exchanges the GTK state with one or more neighbor supplicants in the computer network. Based on the exchange, a supplicant may determine whether any inconsistencies exist in its GTK state, and in response to any inconsistencies in the GTK state, may perform a GTK state synchronization with a security protocol authenticator by indicating to the authenticator what is needed to resolve the inconsistent GTK state at the particular supplicant. In another embodiment, the authenticator, which is configured to not store per-supplicant GTK state, may transmit beacons containing GTK identifiers (IDs) of GTKs currently enabled on the authenticator, and also responds to supplicants having inconsistent GTK states with one or more needed GTKs as indicated by the supplicants.

17 Claims, 11 Drawing Sheets

| GTK BITMAP 600 | | | |
|---|---|---|---|
| 601 | 602 | 603 | 604 |
| 0 | 0 | 0 | 1 |

FIG. 6

DISTRIBUTED GROUP TEMPORAL KEY (GTK) STATE MANAGEMENT

TECHNICAL FIELD

The present disclosure relates generally to computer networks, and, more particularly, to security protocols for shared-media computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Shared-media communication networks, such as wireless networks or power-line communication (PLC) networks (a type of communication over power-lines), provide an enabling technology for networking communication. These technologies can be used, for example, in advanced meter infrastructure (AMI) networks, which may or may not involve LLN solutions. Shared-media communication networks also can be useful within homes and buildings.

Security is an important aspect of many shared-media networks, particularly for LLN solutions. LLNs generally operate over a large physical area, in an uncontrolled environment. Network security may involve, for example, link-layer key management.

Link-layer key management (whether for LLNs or in general) consists of negotiating the link-layer keys used to protect link data frames transmissions from one device to another. The existing enterprise-scale security system for WiFi (e.g., WPA2) utilizes IEEE Std. 802.1X for authentication and establishing the initial security association between a supplicant and the authenticator. WPA2 utilizes the IEEE Std. 802.11i amendment to manage link-layer keys for use with data frame transmissions.

IEEE Std. 802.11i follows a centralized architecture, where the authenticator is responsible for detecting inconsistencies in the supplicant state and initiating updates to the supplicant state. In particular, the authenticator maintains the current state of every supplicant in the network, including what Pairwise Master Keys (PMKs), Pairwise Temporal Keys (PTKs), and Group Temporal Keys (GTKs) are resident on every supplicant in the network. Using that state, the authenticator determines when it must communicate new information to individual supplicants. In other words, the authenticator maintains a central view of what state each supplicant should have and is responsible for updating the supplicants' views whenever a state inconsistency occurs. This centralized design philosophy does not perform well in large-scale networks, and more particularly in LLNs, for a number of reasons.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example bitmap.

DESCRIPTION OF EXAMPLE EMBODIMENTS

Overview

Figure 1:
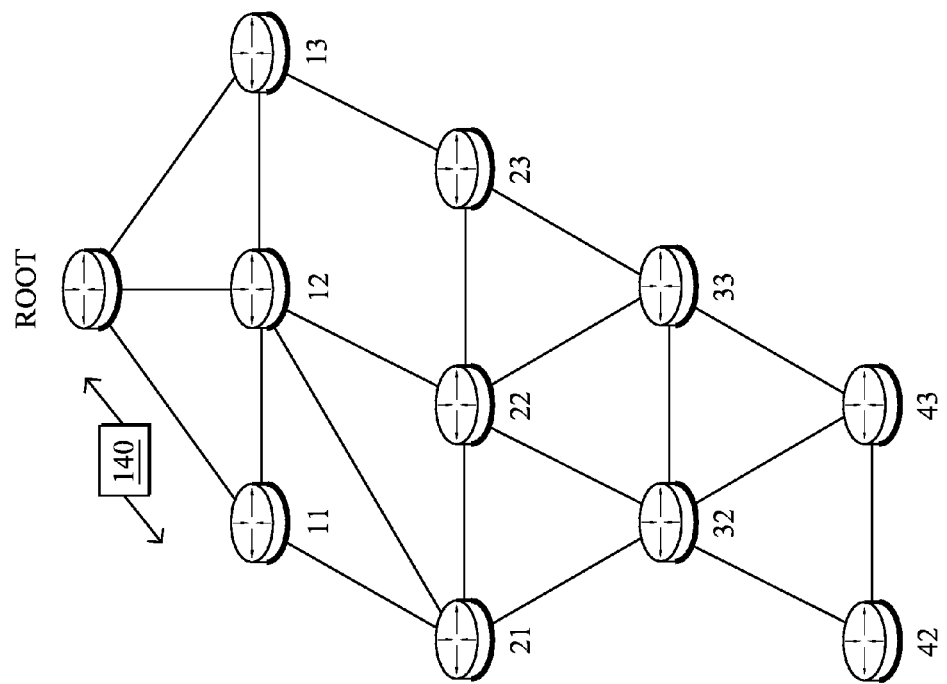
FIG. 1 illustrates an example communication network.
Figure 1:
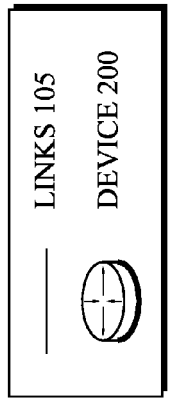

According to one or more embodiments of the disclosure, each security protocol supplicant in a computer network determines its group temporal key (GTK) state, and exchanges the GTK state with one or more neighbor supplicants in the computer network. Based on the exchange, a supplicant may determine whether any inconsistencies exist in its GTK state, and in response to any inconsistencies in the GTK state, may perform a GTK state synchronization with a security protocol authenticator by indicating to the authenticator what is needed to resolve the inconsistent GTK state at the particular supplicant.

According to one or more additional embodiments of the disclosure, the authenticator, which is configured to not store per-supplicant GTK state, may transmit beacons containing GTK identifiers (IDs) of GTKs currently enabled on the authenticator. In response to receiving a GTK state synchronization request from a particular supplicant with an inconsistent GTK state, the authenticator may then determine, from the request, what one or more GTKs are needed to resolve the inconsistent GTK state at the particular supplicant. The authenticator may then reply to the particular supplicant with the one or more needed GTKs.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, which may include functionality for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network 100, and that the view shown herein is for simplicity. Also, those skilled in the art will further understand that while the network 100 is shown in a certain orientation, particularly with a "root" node, the network 100 is merely an example illustration that is not meant to limit the disclosure.

Data packets 140 (e.g., traffic and/or messages sent between the devices/nodes 200) may be exchanged among the nodes/devices 200 of the computer network 100 using predefined network communication protocols such as certain known wireless protocols (e.g., IEEE Std. 802.15.4, IEEE Std. 802.11i, WiFi, Bluetooth®, etc.), PLC protocols, or other shared-media protocols where appropriate. In this context, a protocol includes a set of rules defining how the nodes 200 interact with each other.

Figure 2:
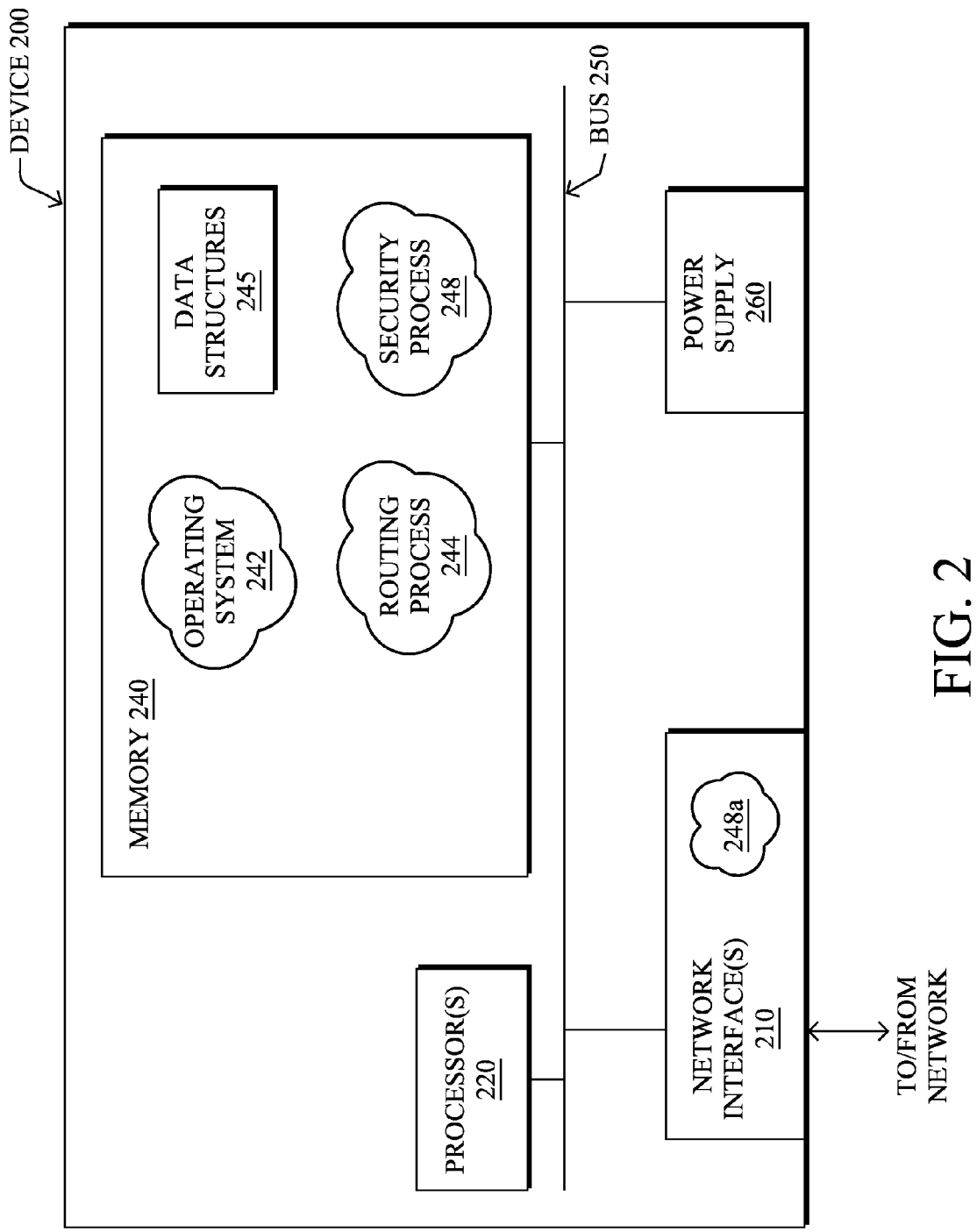
FIG. 2 illustrates an example network device/node.

FIG. 2 is a schematic block diagram of an example node/device 200 that may be used with one or more embodiments described herein, e.g., as any of the nodes shown in FIG. 1 above. The device 200 may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces 210 may be configured to transmit and/or receive data using one or more different communication protocols. Note, further, that the nodes 200 may have one or more different types of network connections 210, e.g., wireless and wired/physical connections, and that the view herein is merely for illustration. Also, while the network interface 210 is shown separately from power supply 260, in certain embodiments (e.g., PLC), the network interface 210 may communicate through the power supply 260, or may be an integral component of the power supply 260. In some specific configurations, the PLC signal may be coupled to the power line feeding into the power supply 260.

The memory 240 comprises a plurality of storage locations that are addressable by the processor 220 and the network interfaces 210 for storing software programs and data structures associated with the embodiments described herein. Note that certain devices 200 may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device 200. These software processes and/or services may comprise routing process/services 244 and an illustrative security process 248, as described herein, among other things. Note that while security process 248 is shown in centralized memory 240, alternative embodiments provide for the process 248 to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, security is an important aspect of many shared-media networks, particularly for LLN solutions, which generally operate over a large physical area in an uncontrolled environment. As an illustrative example, IEEE Std. 802.11 uses a is hierarchical key-management architecture. Typically, network nodes in such an architecture perform mutual authentication using IEEE 802.1x, e.g., with Extensible Authentication Protocol-Transport Layer Security (EAP-TLS) as the authentication method. Though IEEE 802.1x is capable of utilizing any arbitrary key exchange algorithm, one particular example implementation may utilize the Ephemeral elliptic-curve Diffie-Hellman—Elliptic Curve Digital Signature Algorithm (ECDHE_ECDSA) key exchange algorithm. Upon successful authentication, the Field Area Router (FAR)/Authenticator and joining node mutually derive a Pairwise Master Key (PMK). Using the PMK, the FAR and joining node may use an IEEE Std. 802.11 4-way handshake to mutually derive a Pairwise Temporal Key (PTK) from the PMK. Using the PTK, the FAR may then securely communicate Group Temporal Key (GTK) information to the node. The same GTK information is communicated to all nodes that are allowed to access the network. The joining node then uses the GTK(s) to encrypt (decrypt) and sign (authenticate) all link-layer data frames communicated to neighboring nodes.

Whether or not a device possesses the current set of GTKs separates the insider devices from the outsider devices; that is, without possession of a valid GTK, an outsider device is not capable of participating in the network (and by using a network-wide GTK, the network supports efficient link-layer broadcast). By using pairwise keying information (PTK derived from PMK obtained from EAP-TLS), the FAR communicates the GTK to an individual device using a secure channel (potentially over multiple link hops in a LLN), irrespective of the current GTKs installed on existing devices. By using a secure pairwise channel (provided by the PTK), the FAR (authenticator) may communicate new GTK information to only those devices that are allowed to participate in the network (supplicants). Each GTK refresh allows the FAR to define a new group membership. This mechanism allows the protocol to support perfect forward and backward secrecy.

In particular, link-layer key management (e.g., for LLNs or in general) consists of negotiating the link-layer keys used to protect link data frames transmissions from one device to another. The existing enterprise-scale security system for WiFi (e.g., WPA2) utilizes IEEE Std. 802.1X for authentication and establishing the initial security is association between a supplicant and the authenticator. WPA2 utilizes the IEEE Std. 802.11i amendment to manage link-layer keys for use with data frame transmissions.

IEEE Std. 802.11i follows a centralized architecture, where the authenticator is responsible for detecting inconsistencies in the supplicant state and initiating updates to supplicant state. In particular, the authenticator maintains the current state of every supplicant in the network, including what PMKs, PTKs, and GTKs are resident on every supplicant in the network. Using that state, the authenticator determines when it must communicate new information to individual supplicants. In other words, the authenticator maintains a central view of what state each supplicant should have and is responsible for updating the supplicants' views whenever a state inconsistency occurs. This centralized design philosophy does not perform well in large-scale networks, and more particularly in LLNs, for a number of reasons.

The first issue is inconsistent GTK state, where if the authenticator does not have the correct view of the supplicant's GTK state, the authenticator may not update the GTK state at the supplicant in a timely and efficient manner. Having the GTK state at the authenticator creates a state synchronization problem between the authenticator and supplicant, which can be costly and complex since it requires additional communication between the authenticator and supplicant to discover and resolve. Second, LLNs are often associated with dynamic link technologies that communicate over a physical medium that is strongly affected by environmental conditions that change over time. In particular, the set of devices attached to a LLN can be highly dynamic, and devices may come and go at any time and change LLNs without notifying the authenticator. In addition, LLNs typically operate over multiple hops, with communication between the authenticator and supplicant dynamically routed, thus making the maintenance of consistent GTK state especially difficult in such environments. Third, the large-scale can make per-supplicant GTK state management unreasonable on the authenticator.

Distributed GTK State

The techniques herein propose a distributed GTK synchronization mechanism for link-layer security, where GTK state is removed from the authenticator, relying instead on the supplicants to discover inconsistencies in the GTK state and update their own GTK state. Allowing the authenticator to no longer maintain per-supplicant GTK state significantly simplifies and increases robustness of the link-layer security mechanism for large-scale networks, particularly LLNs, while minimizing communication costs and latency to reach a consistent state. Generally, this may be achieved by introducing a new GTK consistency check that allows supplicants to locally determine whether or not they have the latest GTK state and by introducing a new GTK state synchronization protocol between the supplicant and authenticator.

Specifically, according to one or more embodiments of the disclosure as described in detail below, each security protocol supplicant in a computer network determines its group temporal key (GTK) state, and exchanges the GTK state with one or more neighbor supplicants in the computer network. Based on the exchange, a supplicant may determine whether any inconsistencies exist in its GTK state, and in response to any inconsistencies in the GTK state, may perform a GTK state synchronization with a security protocol authenticator by indicating to the authenticator what is needed to resolve the inconsistent GTK state at the particular supplicant. Also, according to one or more additional embodiments of the disclosure, the authenticator, which is configured to not store per-supplicant GTK state, may transmit beacons containing GTK identifiers (IDs) of GTKs currently enabled on the authenticator. In response to receiving a GTK state synchronization request from a particular supplicant with an inconsistent GTK state, the authenticator may then determine, from the request, what one or more GTKs are needed to resolve the inconsistent GTK state at the particular supplicant. The authenticator may then reply to the particular supplicant with the one or more needed GTKs.

Illustratively, the techniques described herein may be performed by hardware, software, and/or firmware, such as in accordance with the security process 248/248a, which may contain computer executable instructions executed by the processor 220 (or independent processor of interfaces 210) to perform functions relating to the techniques described herein, e.g., particularly as the supplicants' distributed GTK state management process (or simply "supplicant process"), or else as an authenticator process for cooperating with the supplicants' distributed GTK state management (or simply "authenticator process"). For example, the techniques herein may be treated as extensions to conventional communication protocols, such as the various wireless or PLC protocols (e.g., IEEE Std. 802.1X and IEEE Std. 802.11i), and as such, may be processed by similar components understood in the art that execute those protocols, accordingly. Note also that while the embodiments describe the mechanisms as an adaptation of IEEE 802.1X and IEEE 802.11i, the concepts described herein are not specific to such protocols, and the embodiments are not so limited.

Operationally, the distributed GTK synchronization mechanism for link-layer security alleviates the need for the authenticator to maintain any GTK state for individual devices, by instead having the supplicants themselves be responsible for ensuring that their GTK state is up-to-date and updating their GTK state when necessary. As previously mentioned, to support this, the techniques herein can include two components:

1) An efficient GTK Consistency Check mechanism that relies on local communication with neighboring nodes (and not communication with a centralized authenticator); and
2) A GTK state synchronization protocol between the supplicant and authenticator.

Since the first component involves a distributed method to ensure that all LLN devices have the latest GTK(s), each supplicant (e.g., nodes 11-43) may first determine their own GTK state (GTKs or simply GTK identifiers and version number). Supplicants may then determine whether their GTK state is consistent by exchanging GTK state information with their neighbor supplicants.

Figure 3:
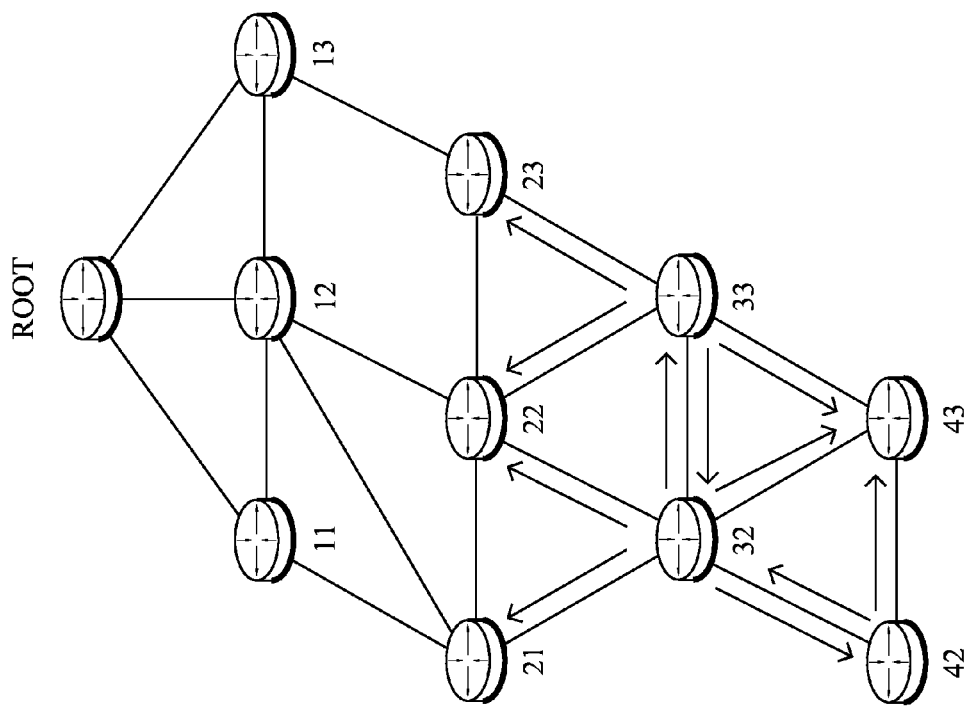
FIG. 3 illustrates an example of beacon messages.
Figure 3:
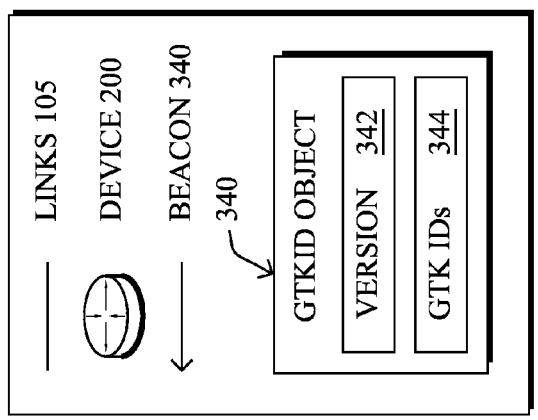

In particular, each authenticated supplicant device and the authenticator itself may periodically beacon a GTK identifier (ID) list object. For example, as shown in FIG. 3, beacons 340 may be exchanged (i.e., transmitted and received) between various devices, such as supplicants 32, 33, and 42 (a representative subset shown). As an example, when is using an illustrative IEEE Std. 802.15.4e communication to distribute the beacons 340, the GTKID list object (beacon 340) may be encoded as a newly defined Information Element and included in IEEE 802.15.4 Beacon messages (protected using a valid GTK to protect against outsider attacks). The GTKID list object may illustratively contain the following information:

1) A GTK state version number 342 to assist in ordering (e.g., globally established by the authenticator for the GTK IDs, as described below); and
2) A list of GTK IDs 344 for the GTKs currently enabled on the transmitting supplicant (e.g., on a particular interface). The GTK IDs 344 may be formed from a cryptographic hash of their respective GTKs (e.g., translating between GTK IDs and GTKs using a cryptographic hashing function), or else may be otherwise assigned separately (e.g., a random key ID).

The GTKID list object allows neighboring devices to determine whether they have the latest GTKs by observing the version number 342, i.e., confirming whether a GTK state version number at a particular supplicant (e.g., node 43) is equal to or newer than a GTK state version number of each neighbor supplicant. If the version number is inconsistent, or if a version number is not used, the GTKID list object also allows the particular supplicant to determine what GTKs are not in sync, by comparing the GTK IDs 344. That is, a supplicant may determine consistency or determine which particular GTKs are needed by confirming whether GTK IDs of GTKs currently enabled on the particular supplicant match GTK IDs of GTKs currently enabled on each neighbor supplicant.

Figure 4A:
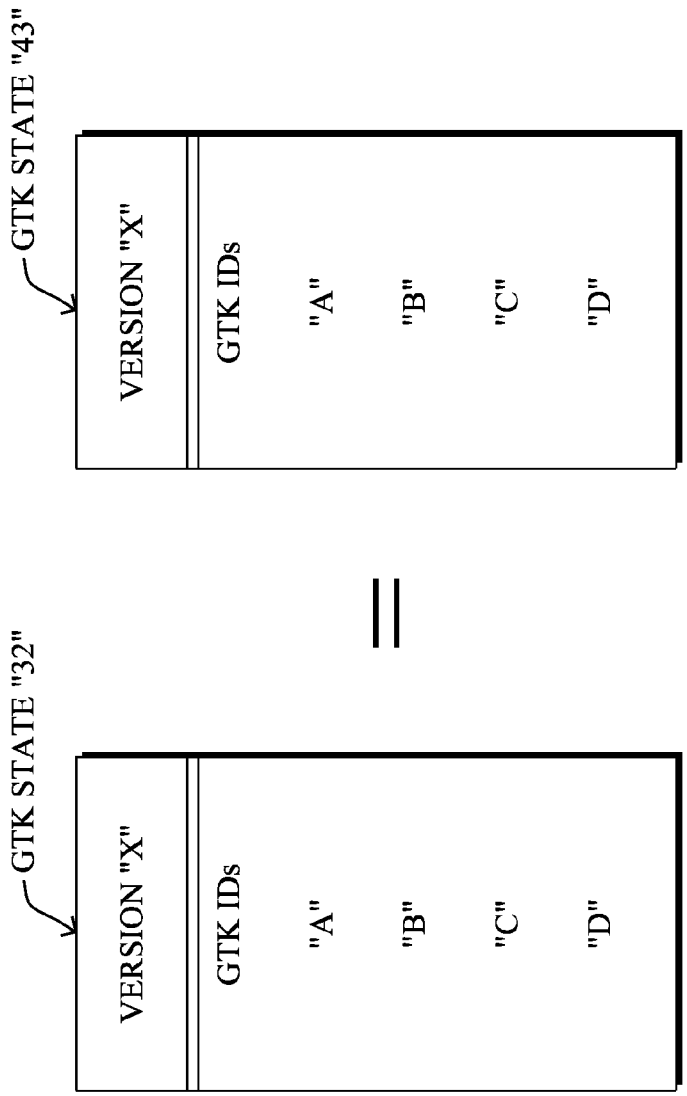
FIG. 4A illustrates an example of a consistent group temporal key (GTK) state.
Figure 4B:
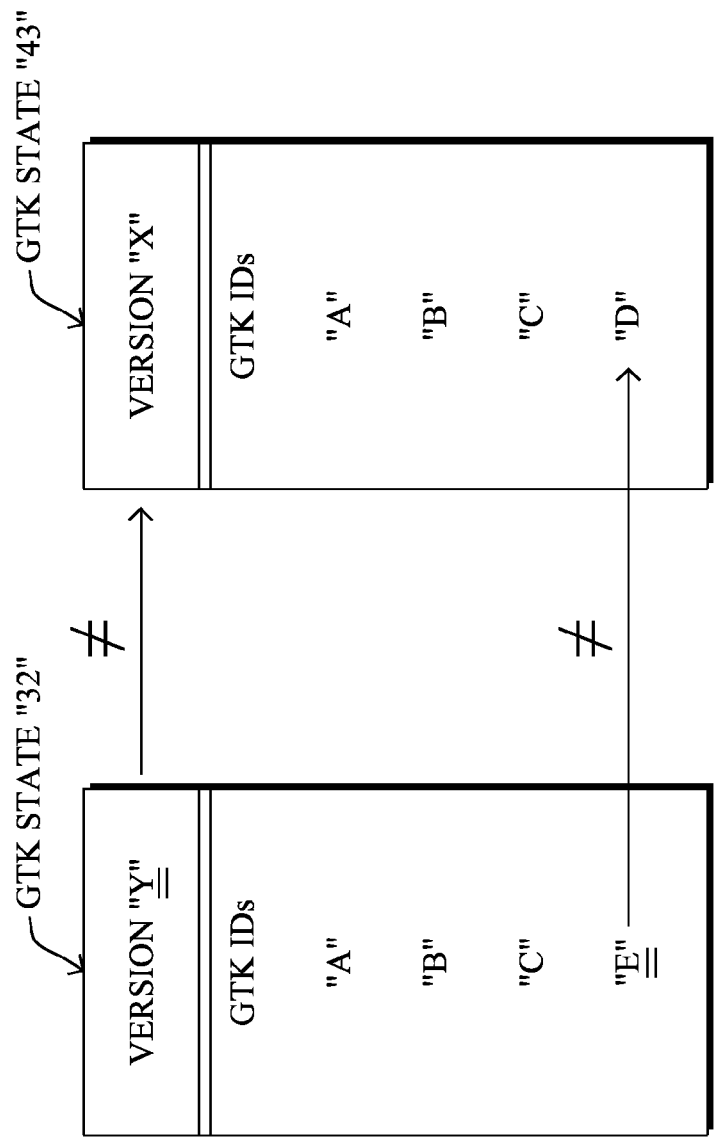
FIG. 4B illustrates an example of an inconsistent GTK state.

As a simplified example, FIGS. 4A and 4B illustrate a consistent GTK state and inconsistent GTK state, respectively. For instance, as shown in FIG. 4A, a particular supplicant (e.g., node 43) may compare its GTK state (version/GTK IDs) to a received beacon's state (e.g., from node 32), and may determine that the versions match (e.g., version "X"), and thus generally that the GTK IDs also match (e.g., "A" through "D"). If node 32 has received an updated version of the GTKs (version "Y"), as shown in FIG. 4B, node 43 may detect the inconsistency, and then by comparing the GTK IDs may determine where the inconsistency lies (e.g., GTK ID "E" has replaced "D").

In response to discovering that it does not have the proper set of GTKs, that is, in response to any inconsistencies in the GTK state, a supplicant can initiate the state synchronization process (described below) with the authenticator (e.g., root/FAR) to rectify the inconsistencies. In that synchronization process, the supplicant can explicitly indicate to the authenticator what is needed to resolve its inconsistent GTK state (e.g., GTK ID "E"). As a result, the authenticator can operate without maintaining information regarding what GTKs are resident on each supplicant (i.e., may be configured to not store per-supplicant GTK state).

Illustratively, whenever one of the GTKs is updated in the authenticator, the authenticator can increment the version number 342 and update its GTKID list object to reflect the changes in beacons 340 that it transmits. Supplicant devices around the authenticator (e.g., nodes 11-13 closest to the root as the authenticator) can detect an inconsistency based on the new version number, and request the updated GTKs from the authenticator until all the GTK IDs match what the authenticator is beaconing. When all the GTK IDs match, those devices can beacon the new GTKID list object with the updated version number so that devices not in range of the authenticator (e.g., nodes 21-23) can also synchronize their GTK IDs, and so on. In certain example embodiments, the authenticator beacons the updated GTKID list object only after synchronizing the GTK state (i.e., only in response to a consistent GTK state), to ensure that any insider attacks affect only the neighbors of the inside attacker.

Compared to the centralized approach described above, this distributed approach significantly reduces communication overhead. In particular, ensuring that the supplicant has the proper GTKs under the distributed approach does not require explicit communication between the supplicant and the authenticator. Instead, the supplicant can determine if any GTK updates are required with strictly local communication. The distributed approach also allows devices that leave and return to a LLN to quickly and efficiently determine if any GTK updates occurred while they were disconnected from the LLN.

Another component of the techniques described herein includes a new GTK state synchronization protocol between the supplicant and authenticator. In particular, in certain embodiments, the state synchronization process is generally only initiated by the supplicant. In contrast, IEEE 802.11i's centralized approach relies on the authenticator to determine state inconsistencies and initiate the state synchronization process. The state synchronization process described herein, however, can be initiated by the supplicant, for example, on the following conditions:

1) The supplicant has determined a GTK state inconsistency when performing the GTK Consistency Check operation described above.
2) The supplicant decides to perform a GTK state synchronization with the authenticator independently of any inconsistencies in the GTK state. For instance, this may occur in response to either having no GTK state (no valid GTKs) or in response to a trigger to confirm validity of neighbor supplicant GTK state (e.g., to rule-out insider attacks). That is, in one embodiment, the supplicant may periodically want to refresh its GTK state to ensure that a neighboring device is not compromised and sending bogus GTK ID list objects.

When any of the above conditions are satisfied, the supplicant can transmit synchronization request messages, such as message 540 described below, illustratively with an exponential backoff (e.g., bounded by a maximum period).

Figure 5:
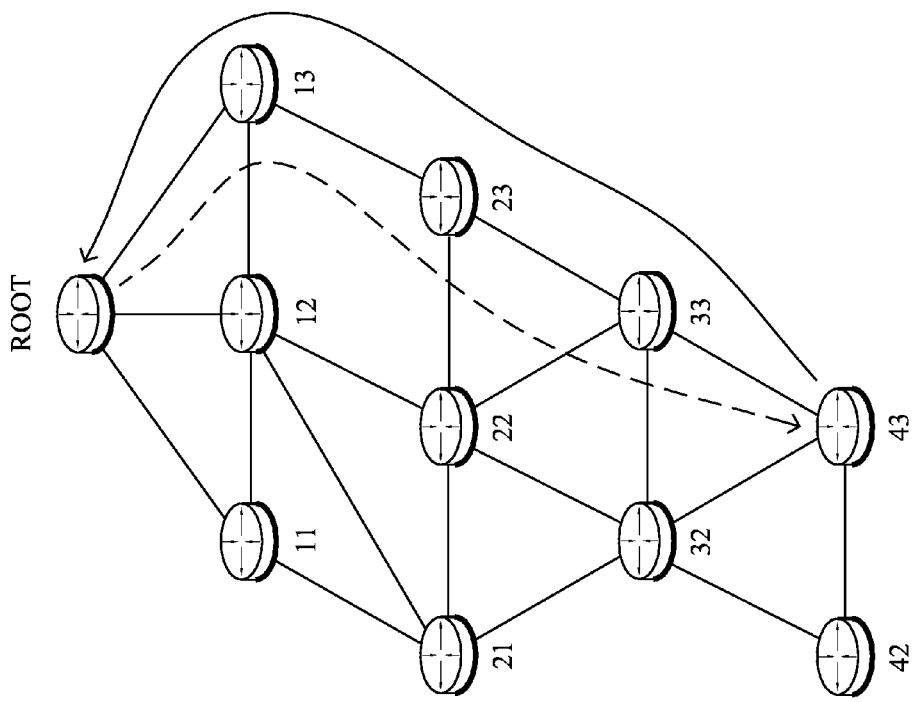
FIG. 5 illustrates an example GTK state synchronization exchange.
Figure 5:
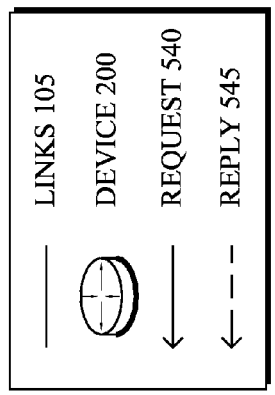

FIG. 5 illustrates a simplified GTK state synchronization exchange between a supplicant (node 43) and an authenticator (root node), in accordance with certain example embodiments. In particular, the request 540 explicitly indicates to the authenticator what is needed to resolve its inconsistent GTK state, such that the authenticator may reply (reply 545) with the needed GTKs. In one embodiment, the supplicant may identify the one or more actual GTK IDs that do not correspond to a GTK at the supplicant (e.g., GTK ID "E" in FIG. 4B). In an alternative embodiment, the supplicant may indicate the desired information using a GTK Bitmap object that may be included in messages sent between the supplicant and authenticator.

Figure 6:
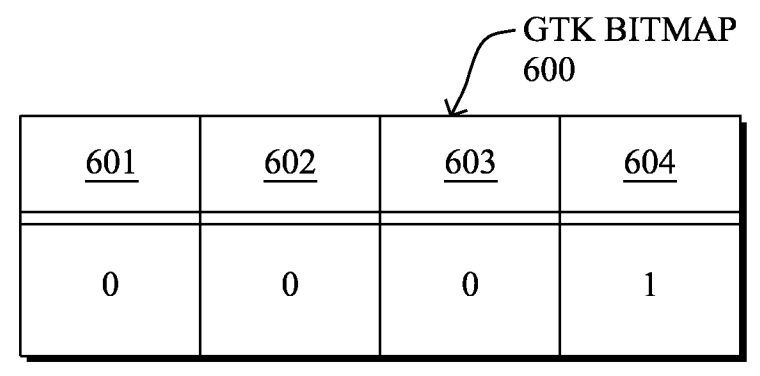

FIG. 6 illustrates an example simplified GTK bitmap 600 that may be used to indicate the needed GTKs. In particular, assuming a set of GTK IDs, those GTK IDs may be represented in bitmap form as a corresponding number of bits. For instance, assuming there are four GTKs (e.g., IDs "A" through "DIE" from FIGS. 4A and 4B described above), then a 4-bit bitmap may be used to represent each of the four possible GTKs, i.e., bits 601-604. Note that, when using IEEE Std. 802.11i, the GTK Bitmap object may, for example, be encoded as a newly defined Key Data (Cryptographic) Encapsulation (KDE) to be included in the Key Data field of EAPOL-Key messages.

When included in requests 540 sent by the supplicant, the GTK bitmap 600 may indicate which GTKs the supplicant would like the authenticator to send to the supplicant. That is, the authenticator may receive a GTK state synchronization request 540 from a particular supplicant (with an inconsistent GTK state), and may then determine, from the request, what one or more GTKs are needed to resolve the inconsistent GTK state at the particular supplicant. Using the illustrative bitmap 600, and assuming that the bits 601-604 are set as "0001" where a one indicates the needed GTKs (or, alternatively, "1110" where a zero indicates what is needed), the authenticator may thus interpret the GTK bitmap, and reply to the particular supplicant with the one or more needed GTKs (e.g., with the GTK corresponding to the fourth GTK ID, "E").

Alternatively, when included in messages sent by the authenticator (e.g., replies 545), the GTK bitmap 600 may indicate which GTK IDs have valid GTKs and whether the supplicant needs to transmit a request message 540. That is, as noted above, GTK state synchronization may be performed with the authenticator independently of any (known/determined) inconsistencies in the GTK state of a supplicant. For instance, a particular supplicant may send GTK IDs of GTKs currently enabled on the particular supplicant to the authenticator. Upon receipt, the authenticator may then determine which, if any, GTK IDs are inconsistent from GTKs currently enabled on the authenticator, such as by comparing the GTK IDs from the supplicant's message to those of the authenticator's GTK state (similar to the beacon comparison above, but here where the authenticator knows that it has the correct GTKs, and any inconsistencies thus rest with the supplicant). As such, the authenticator may then reply to the particular supplicant with an indication of which, if any, GTK IDs are inconsistent from GTKs currently enabled on the authenticator, such as through the use of the GTK bitmap (e.g., "0001"). The receiving supplicant may then send a request 540 for the missing GTKs. Note that as an alternative embodiment, such as when using protocols that do not otherwise dictate the order of a GTK state synchronization, the authenticator may simply initiate the exchange of the new GTKs in response to detecting the inconsistency at the particular supplicant upon receiving the message from the supplicant indicating the GTK IDs of GTKs currently enabled on the particular supplicant.

The GTK Bitmap object 600 (or other indicator) thus allows the authenticator to avoid maintaining any per-supplicant GTK state information. That is, because all the GTK state and logic for requesting individual GTKs are now distributed to the supplicants, the authenticator does not need to know what GTKs are resident at each supplicant, but instead may simply rely on the supplicant to indicate what GTKs are needed by that particular supplicant.

Note that in one or more specific embodiments, a PTKID object may also be included in request messages from the supplicant that allows the authenticator to ensure that the supplicant has the appropriate PTK when sending a request 540. The PTKID may be formed as a keyed hash of the PTK. If the PTKID does not match, the authenticator can initiate a new 4-way handshake to negotiate a new PTK. In IEEE 802.11i, the PTKID object may be encoded as a newly defined KDE value to be included in the Key Data field of EAPOL-Key messages. Similarly, the request message 540 may also include a PMKID to ensure that the supplicant has the appropriate PMK when sending a request. If the PMKID does not match, the authenticator can initiate a new IEEE 802.1X authentication process to establish a new PMK with the supplicant, accordingly.

Because the authenticator may not maintain per-supplicant GTK state, in one or more embodiments, the techniques herein may remove the supplicant's reply from the traditional 802.11i 2-way handshake. That is, the second message of the 2-way handshake can serve only to update the authenticator's per-supplicant state. However, because the state can be kept only on the supplicant themselves, there can be no need to indicate that the supplicant has received the GTK. In other words, replying to a particular supplicant may be performed without an acknowledgment from the particular supplicant that it received the reply 545. If the supplicant fails to receive an update to a GTK refresh request, the supplicant may simply retransmit its request 540.

Figure 7:
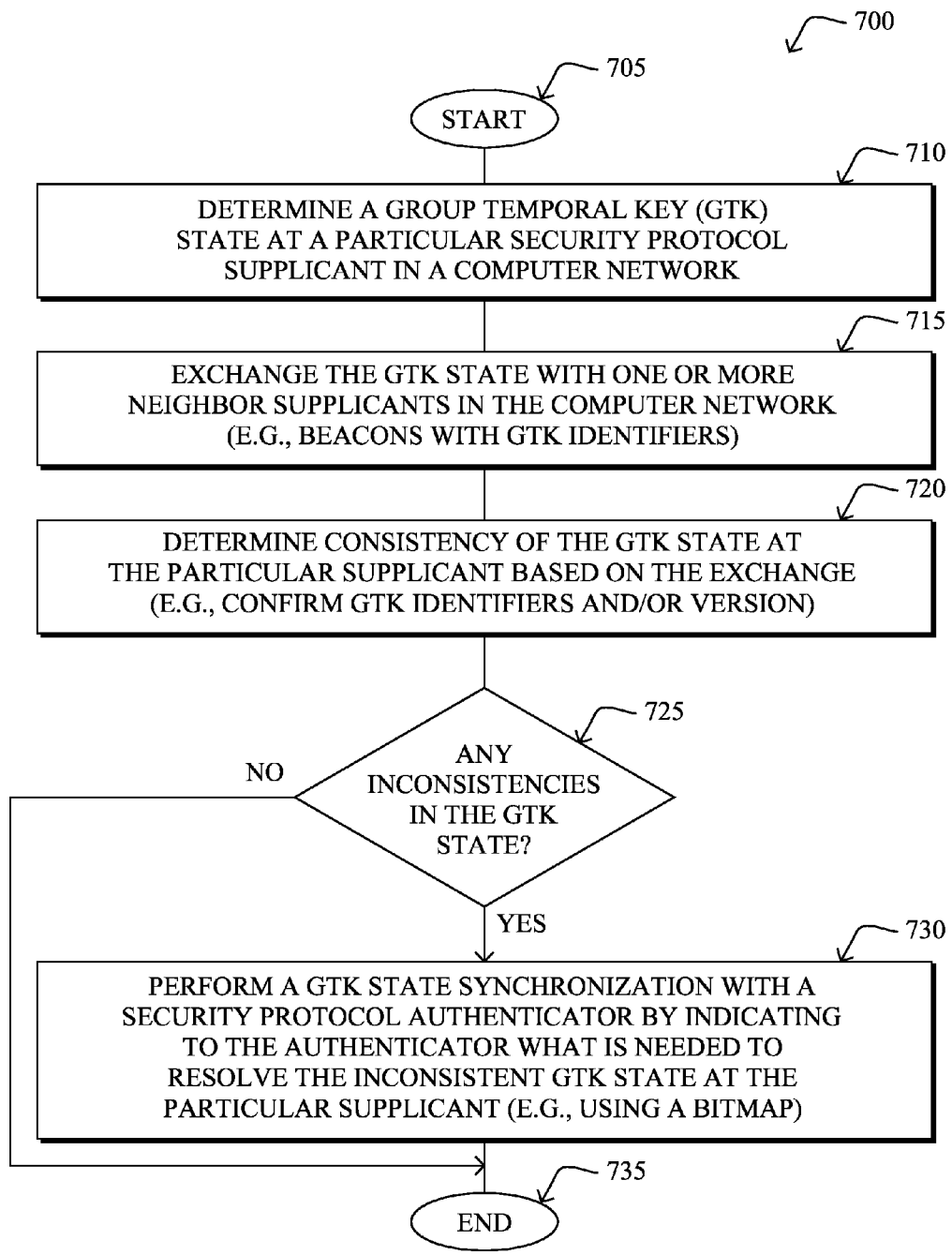
FIG. 7 illustrates an example simplified procedure for distributed GTK management in a computer network, particularly from the perspective of a supplicant.

FIG. 7 illustrates an example simplified procedure 700 for distributed GTK management in a computer network in accordance with one or more embodiments described herein, particularly from the perspective of a supplicant. The procedure 700 may start at step 705, and continues to step 710, where, as described in greater detail above, a supplicant (e.g., node 43) determines its GTK state, and then exchanges the GTK state with one or more neighbor supplicants (e.g., one or more of nodes 32, 33, and 42) in the computer network in step 715 (e.g., via beacons 340 with GTK identifiers). Notably, as described above, the exchange at step 715 may simply entail receipt of neighbor supplicants' beacons, as the GTK state of the particular supplicant (e.g., node 43) may not be confirmed to be consistent.

In step 720, the particular supplicant may determine consistency of its GTK state based on the exchange, such as by confirming its GTK IDs with those in the beacons (e.g., GTK IDs 344), or by confirming the version 342 of the GTK IDs in the beacons and comparing the GTK IDs 344 to determine which GTKs are inconsistent. As described above, in certain example embodiments, the supplicant may confirm the version 342 of the GTK IDs first and then compare the GTK IDs 344 to determine which GTKs are inconsistent. If there are any inconsistencies in the GTK state in step 725, then in step 730 the particular supplicant may perform a GTK state synchronization with an authenticator (e.g., root node or FAR) by indicating to the authenticator what is needed to resolve the inconsistent GTK state at the particular supplicant (e.g., using a bitmap 600), as detailed above. The procedure 700 illustratively ends in step 735, though may continue to receive (and transmit) beacons to maintain a consistent GTK state in a distributed manner as described herein.

Figure 8:
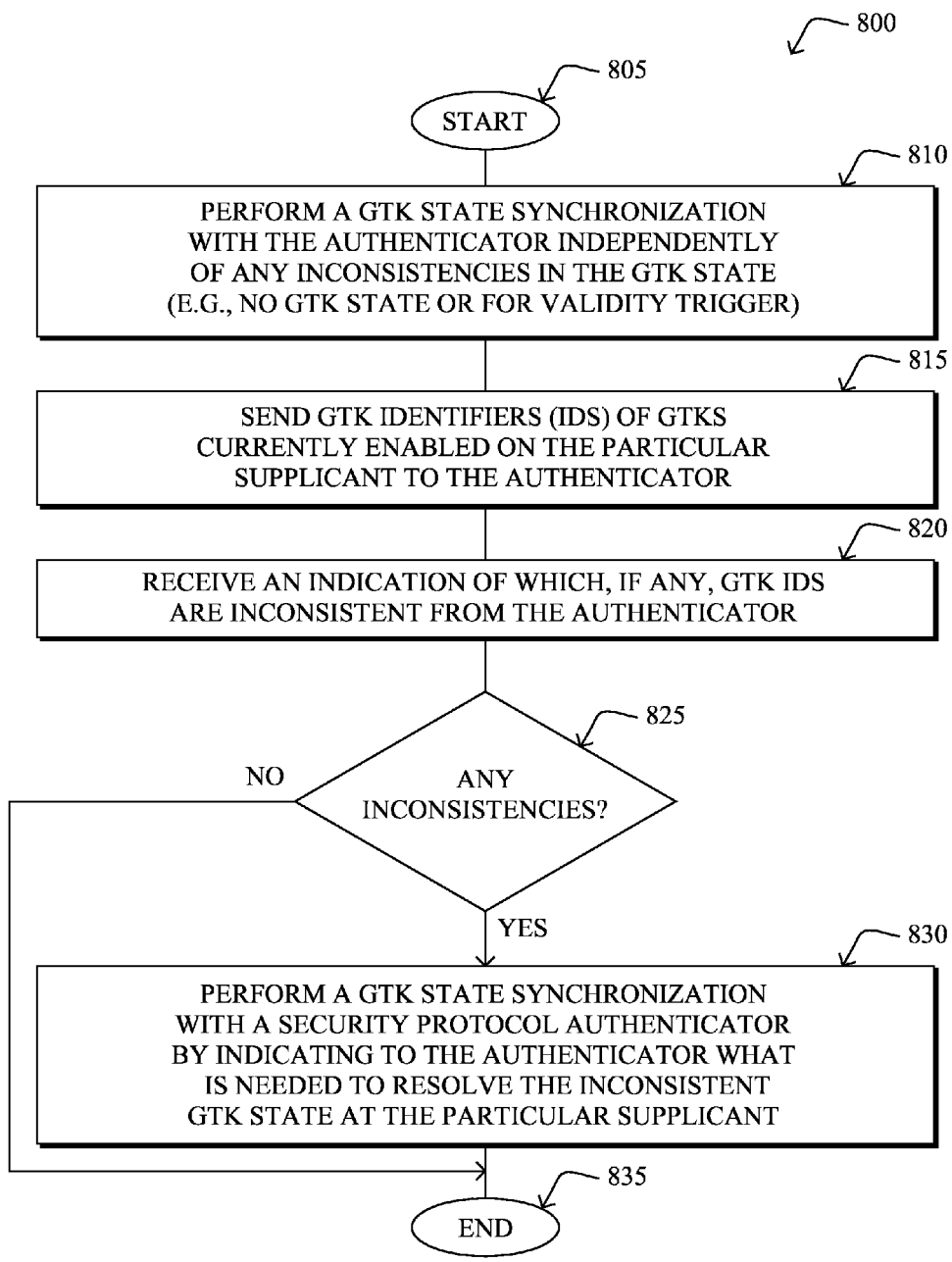
FIG. 8 illustrates another example simplified procedure for distributed GTK management in a computer network, particularly from the perspective of a supplicant for GTK synchronization independent of GTK state inconsistency.

In addition, FIG. 8 illustrates another example simplified procedure for distributed GTK management in a computer network in accordance with one or more embodiments described herein, particularly from the perspective of a supplicant for GTK synchronization independent of GTK state inconsistency. For instance, the procedure 800 may start at step 805, and continues to step 810, where a GTK state synchronization may be performed with the authenticator independently of any inconsistencies in the GTK state, such as when there is no GTK state (no GTKs) or based on a validity trigger (e.g., periodically, suspicion-based, etc.). As such, in step 815 the particular supplicant may send its GTK IDs to the authenticator for GTKs currently enabled on the particular supplicant. In response, in step 820, the particular supplicant may receive an indication of which, if any, GTK IDs are inconsistent from the authenticator. If there are any inconsistencies in step 825, then in step 830 the particular supplicant may then perform a GTK state synchronization with the authenticator by indicating what is needed to resolve the particular supplicant's inconsistent GTK state. The procedure 835 may then end in step 835, until a next GTK state synchronization is to be performed with the authenticator independently of any GTK state inconsistencies.

Figure 9:
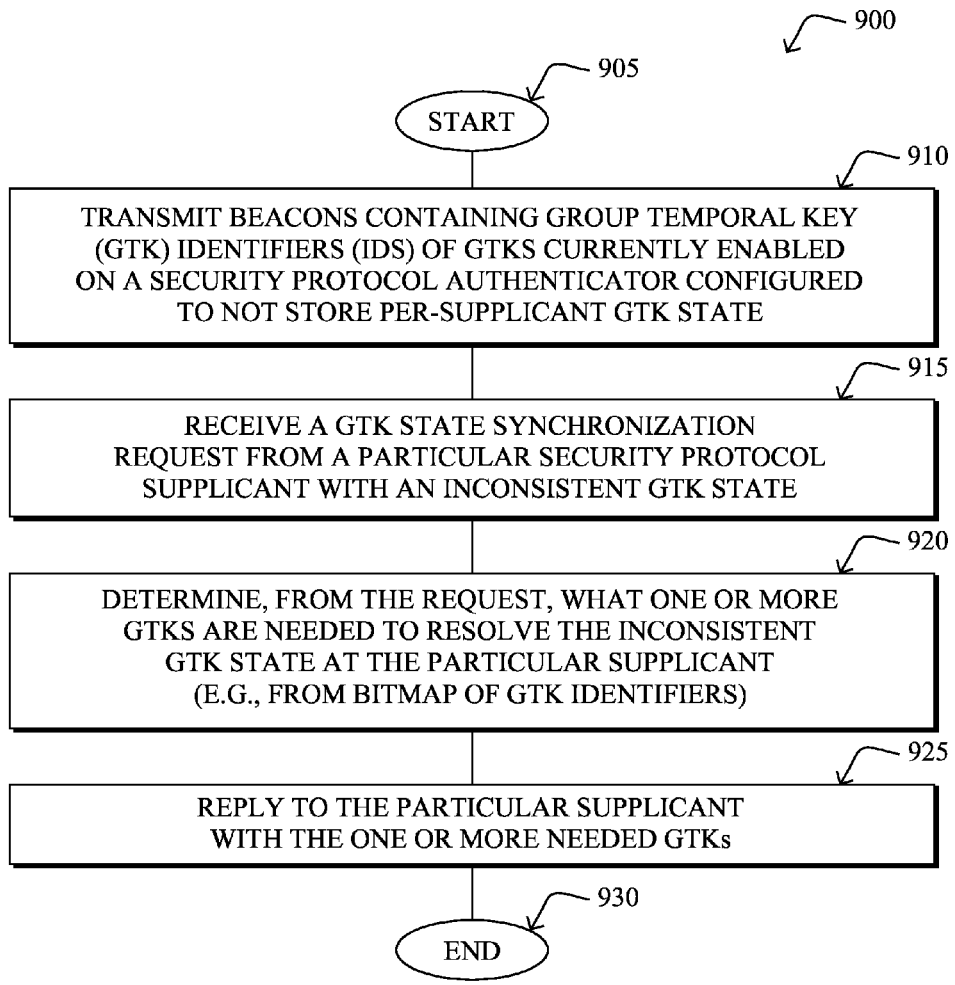
FIG. 9 illustrates another example simplified procedure for distributed GTK management in a computer network, particularly from the perspective of an authenticator.

From the perspective of an authenticator (configured to not store per-supplicant GTK state), FIG. 9 illustrates another example simplified procedure for distributed GTK management in a computer network in accordance with one or more embodiments described herein. The procedure 900 may start at step 905, and continues to step 910, where, as described in greater detail above, the authenticator transmits beacons containing GTK IDs of GTKs currently enabled on the authenticator. In step 915, the authenticator may receive a GTK state synchronization request 540 from a particular security protocol supplicant with an inconsistent GTK state. Accordingly, in step 920, the authenticator may determine, from the request, what one or more GTKs are needed to resolve the inconsistent GTK state at the particular supplicant (e.g., from bitmap 600 of GTK IDs). The authenticator may then reply to the particular supplicant in step 925 with the one or more needed GTKs, and the procedure may end in step 930, notably with the option of continuing to transmit beacons and/or to receive additional synchronization requests.

Figure 10:
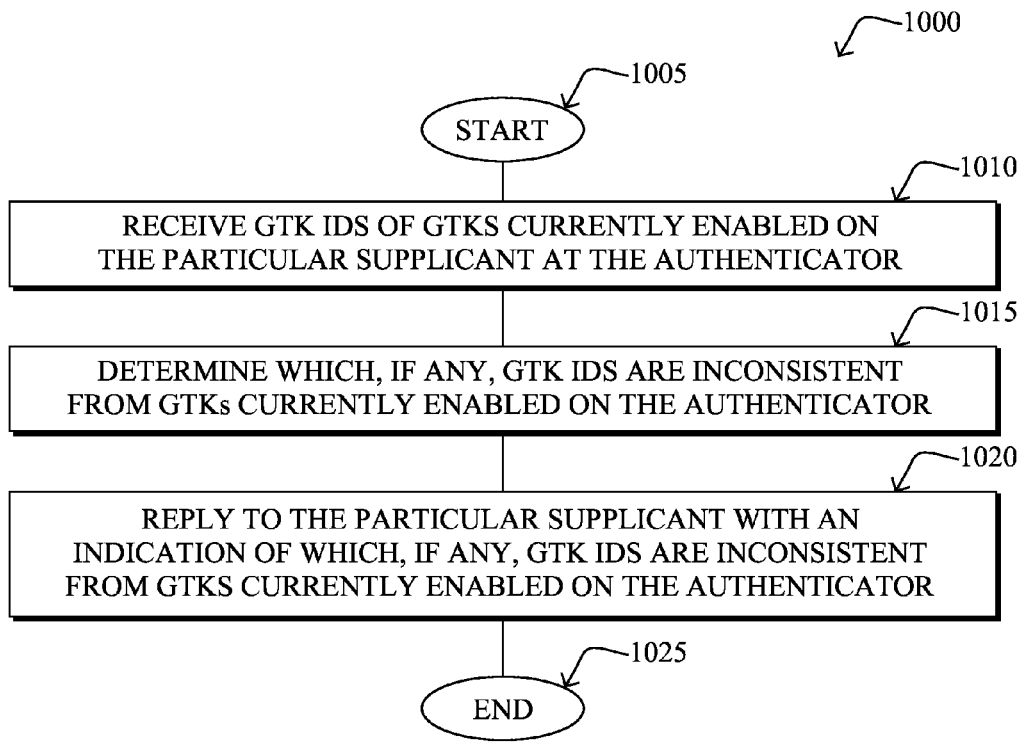
FIG. 10 illustrates another example simplified procedure for distributed GTK management in a computer network, particularly from the perspective of an authenticator for GTK synchronization independent of GTK state inconsistency.

Lastly, FIG. 10 illustrates another example simplified procedure for distributed GTK management in a computer network in accordance with one or more embodiments described herein, particularly from the perspective of an authenticator for GTK synchronization independent of GTK state inconsistency. The procedure 1000 may start at step 1005, and continues to step 1010, where, as described in greater detail above, the authenticator receives GTK IDs of GTKs currently enabled on the particular supplicant, such that the authenticator may determine in step 1015 which, if any, GTK IDs are inconsistent from GTKs currently enabled on the authenticator. In step 1020, the authenticator may reply to the particular supplicant with an indication of which, if any, GTK IDs are inconsistent from GTKs currently enabled on the authenticator, and the procedure 1000 may then end in step 1025.

It should be noted that while certain steps within procedures 700-1000 may be optional as described above, the steps shown in FIGS. 7-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-1000 are described separately, certain steps from each procedure may be incorporated into each other procedure, and the procedures are not meant to be mutually exclusive.

The techniques described herein, therefore, can provide for distributed GTK management in a computer network, particularly for LLNs. Notably, the techniques herein can provide scalability and reliability enhancements to improve the applicability and performance of key management (e.g., 802.11-based) in large-scale LLNs. In particular, by distributing the GTK state consistency check and synchronization among the supplicants, the supplicants can more efficiently and quickly discover inconsistencies in their GTK state and more efficiently refresh their GTK state. Also, by removing per-supplicant GTK state and refresh logic from the authenticator, complexity of the authenticator can be reduced, and a more robust and agile system can be established since there may be fewer opportunities for state inconsistencies between the supplicant and authenticator. Furthermore, eliminating dynamic state further can minimize the number of writes to non-volatiles storage, which can be important, for example, for a Field Area Router that typically uses Flash memory with limited write cycles.

Notably, certain embodiments of the techniques herein may achieve various security objectives, including, without limitation:
1) Only allowing devices that have successfully completed mutual authentication to participate in a network. In particular, the focus can be on guaranteeing message authenticity, integrity, and confidentiality for link-layer data frames communicated between authenticated devices.
2) Supporting secure link-layer key refresh triggered periodically or explicitly by an operator.
3) Supporting forward and backward secrecy of link-layer data frames on LLN membership change. The group can be defined by the set of devices that possess the current shared group key. The sequence of shared group keys (refreshed over time) can define the time-series of LLN groups.
4) Supporting efficient link-layer broadcast, maintaining the physical properties of radio/PLC/shared-media communication.
5) Supporting efficient operation in LLNs while quickly resolving inconsistencies. Connectivity in LLNs is highly dynamic (nodes may leave or message loss may occur for short or long periods of time) and any inconsistencies in the security state of nodes can be quickly yet efficiently discovered and resolved.

Additionally, it is worth noting that the techniques herein can ensure synchronization by providing an efficient mechanism to allow devices to determine if they have the latest GTK information via an eventual consistency process. Since, in certain embodiments, devices (supplicants) can periodically communicate a summary of the most recent GTK information known to them using the GTK List Object, when a device notices that it does not have the most up-to-date GTK information, it can initiate a GTK Request message to the authenticator (e.g., FAR) to resolve the inconsistency. This eventual consistency technique can reduce control messages sent to the authenticator, which often represents the bottleneck in large-scale LLNs (e.g., as typically seen in Smart Grid AMI networks).

Moreover, the GTK consistency checks and synchronization mechanisms described herein may help mitigate both passive and active attacks from a device that is not part of the network (i.e., does not posses the current GTK). The techniques may also mitigate and localize any side effects that may be caused by a compromised device participating in the network. Specifically, these mentioned features may be achieved according to the techniques herein since, in certain example embodiments:
1) A device may rely on all of its authenticated neighbors for the GTK consistency check;
2) A device may always communicate with the authenticator using a secure channel to resolve any GTK inconsistencies; and
3) A device may utilize multiple paths in the case that the authenticator is multiple hops away to mitigate the effects of a compromised device.

In addition, the techniques herein also can address typical denial-of-service (DoS) attacks, such as those as follows:
1) In certain embodiments, outsider attacks using the GTKID list object is not possible, since the GTKID list object is protected using a valid GTK, and devices will not accept a GTKID list object that is not properly signed with a valid GTK.
2) One potential insider attack using the GTKID is to continuously indicate consistency of GTKs. In typical cases, a supplicant will receive GTKID list objects from other neighboring nodes. Receiving a single GTKID list object indicating an inconsistency will cause the device to initiate a request to the authenticator. In the worst case, all of the target devices' GTKs will eventually expire, causing the target device to initiate a request to the authenticator for new GTK information.
3) Another potential insider attack using the GTKID is to continuously indicate inconsistency of GTKs. This attack will cause a supplicant to initiate a request to the authenticator and cause the authenticator to communicate the latest GTK information. In one view, this will work against the attacker in cases where the authenticator is attempting to refresh the GTK(s). When the authenticator is not attempting to refresh the GTK(s), this attack can be viewed as a form of DoS and should be detected/reported on both the authenticator and supplicant.
4) Still another potential insider attack is to drop packets between the authenticator and a supplicant to cause the 4-way and/or 2-way handshake to fail. Utilizing multiple paths on different attempts would allow a supplicant to route around the attacker. In the worst case, all of the target devices' GTKs will eventually expire, causing the target device to initiate a request to the authenticator for new GTK information.

5) One last potential attack is to spoof a request message with a bogus PMKID and/or PTKID. To prevent such attacks, one option is to configure devices to not install new PMK and PTK information until after the full exchange (e.g., EAP-TLS or 4-way handshake) completes successfully.

While there have been shown and described illustrative embodiments that provide for distributed GTK management in a computer network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols. In addition, while certain protocols are shown, such as various IEEE Std. protocols (e.g., 802.1X, 802.15.4 or 802.11i), other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a particular security protocol supplicant in a computer network, a group temporal key (GTK) state at the particular supplicant;
   exchanging, by the particular supplicant, the GTK state with one or more neighbor supplicants in the computer network, wherein the exchanging comprises: receiving at least one beacon from at least one neighbor supplicant, each beacon comprising a GTK identifier (ID) for each GTK currently enabled on the neighbor supplicant;
   determining whether any inconsistencies exist in the GTK state at the particular supplicant based on the exchange; and
   in response to determining that any inconsistencies exist in the GTK state, performing, by the particular supplicant, a GTK state synchronization with a security protocol authenticator by indicating to the authenticator what is needed to resolve the inconsistent GTK state at the particular supplicant.

2. The method as in claim 1, wherein exchanging further comprises:
   transmitting at least one beacon comprising a GTK identifier (ID) for each GTK currently enabled on the particular supplicant to one or more neighbor supplicants in response to a consistent GTK state at the particular supplicant.

3. The method as in claim 1, further comprising:
   translating between GTK IDs and GTKs using a cryptographic hashing function.

4. The method as in claim 1, wherein each beacon includes a GTK state version that is globally established by the authenticator for the GTK IDs.

5. The method as in claim 1, wherein determining whether any inconsistencies exist comprises:
   determining, for each neighbor supplicant, whether each GTK identifier (ID) of each GTK currently enabled on the particular supplicant matches a GTK ID of a GTK currently enabled on the neighbor supplicant.

6. The method as in claim 1, wherein determining whether any inconsistencies exist comprises:
   determining, for each neighbor supplicant, whether a GTK state version number at the particular supplicant is equal to or newer than a GTK state version number of the neighbor supplicant.

7. The method as in claim 1, wherein indicating to the authenticator what is needed to resolve the inconsistent GTK state comprises:
   transmitting to the authenticator a GTK bitmap that indicates each GTK needed by the particular supplicant.

8. The method as in claim 1, further comprising:
   performing, by the particular supplicant, a GTK state synchronization with the authenticator independently of determining that any inconsistencies exist in the GTK state.

9. The method as in claim 8, wherein performing the GTK state synchronization with the authenticator independently of determining that any inconsistencies exist in the GTK state is in response to either having no GTK state or in response to a trigger to confirm validity of neighbor supplicant GTK state.

10. The method as in claim 8, wherein performing the GTK state synchronization with the authenticator independently determining that any inconsistencies exist in the GTK state comprises:
    sending each GTK identifier (ID) of each GTK currently enabled on the particular supplicant to the authenticator; and receiving an indication of which, if any, GTK IDs are inconsistent from the authenticator.

11. A method, comprising:
    transmitting at least one beacon comprising a group temporal key (GTK) identifier (ID) of each GTK currently enabled on a security protocol authenticator configured to not store per-supplicant GTK state;
    receiving a GTK state synchronization request from a particular security protocol supplicant with an inconsistent GTK state;
    determining, from the request, what one or more GTKs are needed to resolve the inconsistent GTK state at the particular supplicant; and
    replying to the particular supplicant with the one or more needed GTKs,
    wherein determining, from the request, what one or more GTKs are needed to resolve the inconsistent GTK state at the particular supplicant comprises:
    interpreting a GTK bitmap from the request that indicates the GTKs needed.

12. The method as in claim 11, further comprising:
    receiving GTK IDs of GTKs currently enabled on the particular supplicant at the authenticator;
    determining which, if any, GTK IDs are inconsistent from GTKs currently enabled on the authenticator; and
    replying to the particular supplicant with an indication of which, if any, GTK IDs are inconsistent from GTKs currently enabled on the authenticator.

13. The method as in claim 11, wherein replying to the particular supplicant with the one or more needed GTKs comprises:

replying to the particular supplicant without an acknowledgment from the particular supplicant that the particular supplicant received the reply.

14. An apparatus, comprising:
one or more network interfaces to communicate within a computer network;
a processor coupled to the network interfaces and adapted to execute one or more processes; and
a memory configured to store a supplicant process executable by the processor, the process when executed operable to:
determine a group temporal key (GTK) state of the supplicant process;
exchange the GTK state with one or more neighbor supplicants in the computer network, wherein the process when executed to the exchange is operable to:
receive at least one beacon from at least one neighbor supplicant, each beacon comprising a GTK identifier (ID) for each GTK currently enabled on the neighbor supplicant; and
transmit at least one beacon comprising a GTK ID for each GTK currently enabled on the supplicant process to one or more neighbor supplicants in response to a consistent GTK state at the particular supplicant;
determine whether any inconsistencies exist in the GTK state of the supplicant process based on the exchange; and
in response to determining that any inconsistencies exist in the GTK state, perform a GTK state synchronization with a security protocol authenticator by indicating to the authenticator what is needed to resolve the inconsistent GTK state of the supplicant process.

15. The apparatus as in claim 14, wherein the process when executed to determine whether any inconsistencies exist is further operable to:
determine, for each neighbor supplicant, whether each GTK identifier (ID) of each GTK currently enabled on the supplicant process matches a GTK ID of a GTK currently enabled on the neighbor supplicant; and
determine, for each neighbor supplicant, whether a GTK state version number at the supplicant process is equal to or newer than a GTK state version number of the neighbor supplicant.

16. The apparatus as in claim 14, wherein the process when executed to indicate to the authenticator what is needed to resolve the inconsistent GTK state is further operable to:
transmit to the authenticator a GTK bitmap that indicates each GTK needed by the supplicant process.

17. An apparatus, comprising:
one or more network interfaces to communicate within a computer network;
a processor coupled to the network interfaces and adapted to execute one or more processes; and
a memory configured to store an authenticator process executable by the processor, the process when executed operable to:
transmit at least one beacon comprising a group temporal key (GTK) identifier (ID) of each GTK currently enabled by the authenticator process, the authenticator process configured to not store per-supplicant GTK state;
receive a GTK state synchronization request from a particular security protocol supplicant with an inconsistent GTK state;
determine, from the request, what one or more GTKs are needed to resolve the inconsistent GTK state at the particular supplicant; and
reply to the particular supplicant with the one or more needed GTKs,
wherein the determination, from the request, what one or more GTKs are needed to resolve the inconsistent GTK state at the particular supplicant a process when executed operable to:
interpret a GTK bitmap from the request that indicates the GTKs needed.

* * * * *